US010975900B1

(12) United States Patent
Roth (10) Patent No.: US 10,975,900 B1
(45) Date of Patent: Apr. 13, 2021

(54) APPARATUS AND METHOD FOR BRACING A LOAD

(71) Applicant: Steven Andrew Roth, Danville, CA (US)

(72) Inventor: Steven Andrew Roth, Danville, CA (US)

(*) Notice: Subject to any disclaimer, the term of this patent is extended or adjusted under 35 U.S.C. 154(b) by 0 days.

(21) Appl. No.: 16/149,641

(22) Filed: Oct. 2, 2018

Related U.S. Application Data

(60) Provisional application No. 62/606,639, filed on Oct. 2, 2017.

(51) Int. Cl.
*F16L 3/00* (2006.01)
*F16B 7/04* (2006.01)
*F16M 13/02* (2006.01)

(52) U.S. Cl.
CPC .............. *F16B 7/0433* (2013.01); *F16L 3/00* (2013.01); *F16M 13/022* (2013.01)

(58) Field of Classification Search
CPC combination set(s) only.
See application file for complete search history.

(56) References Cited

U.S. PATENT DOCUMENTS

| 1,281,531 | A | * | 10/1918 | Dietrich | F16L 3/24 248/228.5 |
| 4,793,578 | A | * | 12/1988 | Howard | F16L 3/222 248/62 |
| 6,012,691 | A | * | 1/2000 | van Leeuwen | F16L 3/24 248/228.3 |
| 9,777,780 | B2 | * | 10/2017 | Yamagami | F16D 27/112 |
| 2013/0099068 | A1 | * | 4/2013 | Lacour | E04C 5/122 248/62 |

* cited by examiner

*Primary Examiner* — Jun S Yoo
(74) *Attorney, Agent, or Firm* — Steven R. Vosen (57) ABSTRACT

A clamp for joining rods and a method for joining rods used for bracing a load is presented. The clamp has an opening to accept threaded portions of each of a pair of rods, which are parallel to each other with threads touching. The clamp forces the thread portions of the rods together to allow the rods to support compressive and tensile loads. The clamps may be used in pairs to provide added bending resistance to the rods.

19 Claims, 6 Drawing Sheets

APPARATUS AND METHOD FOR BRACING A LOAD

CROSS-REFERENCE TO RELATED APPLICATIONS

This application claims the benefit of U.S. Provisional Application No. 62/606,639, filed Oct. 2, 2017, whose contents are hereby incorporated by reference in its entirety.

BACKGROUND OF THE INVENTION

Field of the Invention

The present invention relates to an apparatus and a method for bracing a load, and more particularly to an apparatus and method for joining rods to provide stability to the load.

Discussion of the Background

Figure 1A:
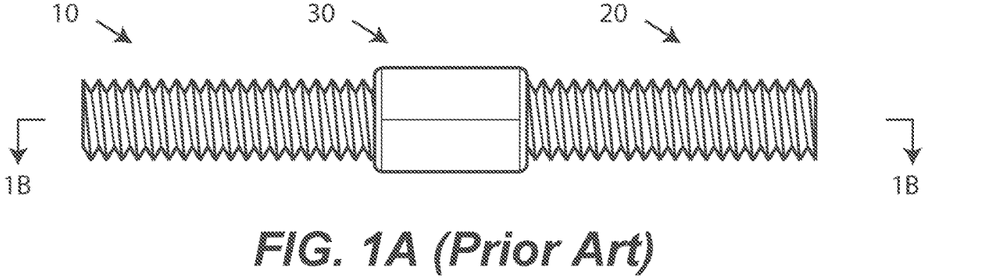
FIG. 1A is a side view of a prior art threaded rod connector.
Figure 1B:
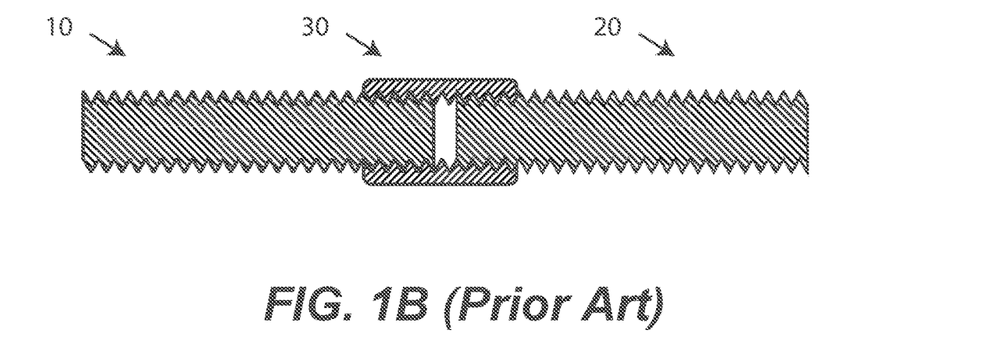
FIG. 1B is a sectional view 1B-1B of FIG. 1A of the prior art threaded rod connector.

Threaded rods are sometimes used for connecting mechanical elements. Thus, for example, threaded rods are used to stabilize loads against seismic disturbances. See, for example, U.S. Pat. No. 9,777,870, the contents of which are hereby incorporated by references, in which threaded rods are used to secure a load to a ceiling. Typically, such rods may be joined using a threaded rod connector. FIG. 1A is a side view of a prior art threaded rod connector, and FIG. 1B is a sectional view 1B-1B of FIG. 1A. FIGS. 1A and 1B show a first threaded rod 10 and second threaded rod 20 joined using a threaded rod connector 30. Typically, rods 10 and 20 have the same diameter and thread pitch. Threaded rod connector 30 has inner threads to match the threads of rods 10 and 20 and typically has a hexagonal outer shape to facilitate tightening the connector.

Threaded rod connectors, such as threaded rod connector 30, are useful for joining to the ends of rods, they require that the rods be perfectly aligned for threading into the connector. In addition, it may be difficult to determine, after the fact, that a rod protrudes far enough into the connector, such as 3 or more turns, to provide the full strength of connection. In addition, there is no generally useful device for joining rods having different diameters or different thread pitches.

There is a need in the art for a device and method for connecting rods that is easy to use and to inspect, and that provides for easier alignment of the connected rods having the same or different diameters or thread pitches. The inventive device should be inexpensive and generally compatible with current uses of rods. The method should allow for easy and accurate alignment of the rods.

BRIEF SUMMARY OF THE INVENTION

The present invention overcomes the disadvantages of prior art by providing an apparatus and method of joining rods having threads.

It is one aspect to provide a method of bracing a hanger supporting a load from a structure. The method includes: attaching a first rod to the hanger; attaching a second rod to the structure; and clamping a threaded portion of the first rod to a threaded portion of the second rod.

In one embodiment, the clamping includes clamping a threaded portion of the first rod to a threaded portion of a third rod and clamping a threaded portion of the second rod to a threaded portion of the third rod.

In another embodiment, the method further includes clamping a second threaded portion of the first rod to a second threaded portion of the second rod.

In various embodiments, a first diameter of the first rod and a diameter of the second diameter are the same, or are different.

In various other embodiments, a first thread pitch of the thread of the first rod and a second thread pitch of the thread of the second rod are the same, or are different.

It is another aspect to provide an apparatus configured to join a first rod having a first diameter and including first threads having a first thread pitch, and a second rod having a second diameter and including second threads having a second thread pitch. The apparatus includes: a body having a length and an opening that extends along the length; and a fastener in contact with the body. When the first rod and the second rod are accepted in the body with at least a portion of the first threads in contact with at least a portion of the second threads, and when the fastener is tightened, the apparatus imparts a force that compresses the first rod and the second rod, such that the force inhibits relative motion between the accepted first rod and the accepted second rod.

These features together with the various ancillary provisions and features which will become apparent to those skilled in the art from the following detailed description, are attained by the method and apparatus of the present invention, preferred embodiments thereof being shown with reference to the accompanying drawings, by way of example only, wherein:

DETAILED DESCRIPTION OF THE INVENTION

Reference symbols are used in the Figures to indicate certain components, aspects or features shown therein, with reference symbols common to more than one Figure indicating like components, aspects or features shown therein.

The present invention includes an apparatus and method of joining rods having threaded portions. The apparatus will be referred to herein, and without limitation, as a "clamp." The clamp accepts the rods being joined with overlapping threaded rod portions within the body of the clamp. The clamp provides a force on threaded portions of the rods towards one another which prevents motion of the rods relative to each other. The amount of overlap of threads within the apparatus is selected to resist tension and/or compression loads, such as those imposed by sway or seismic movement of a suspended pipe, or other suspended construction traded item. Additionally, the length of the overlap of the threads of the rods, in combination with the number of clamps installed to join the overlap can be configured to develop a compression resistance capacity greater than that of a single one-piece continuous threaded rod, without overlap.

Figure 2A:
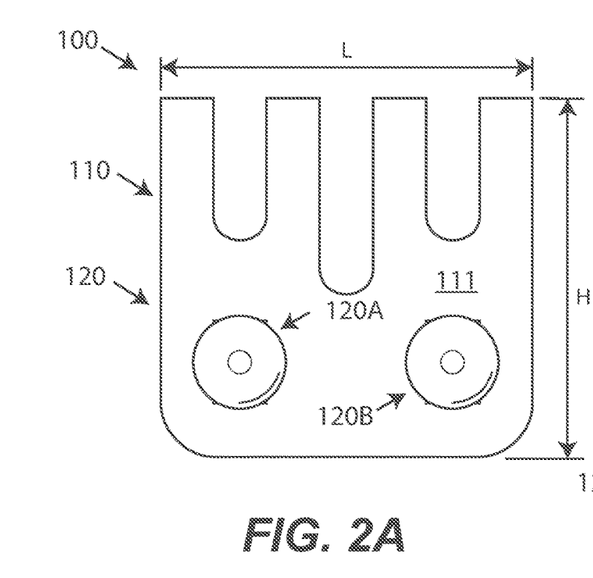
FIGS. 2A and 2B are a front side and end view, respectively, of one embodiment of a clamp.
Figure 2B:
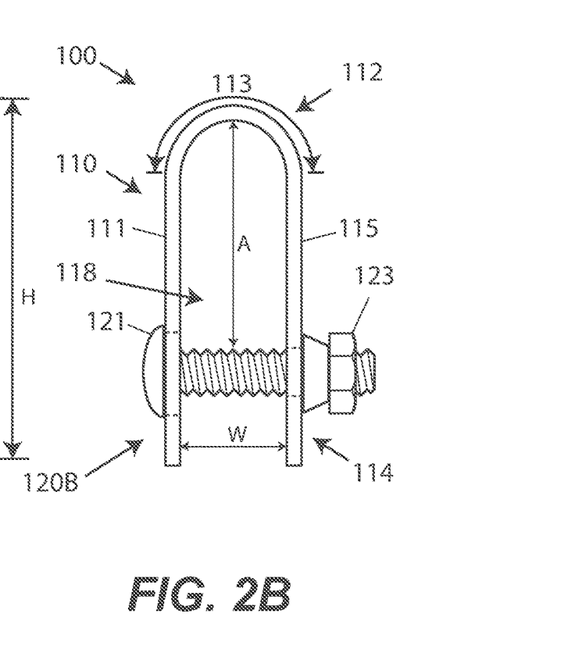
Figure 3A:
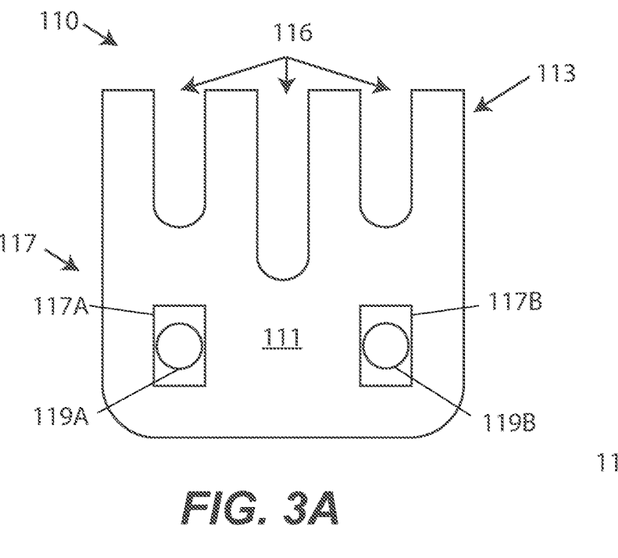
FIGS. 3A, 3B, and 3C are a front side view, an end view, and a rear side view, respectively, of the body of FIG. 2A.
Figure 3B:
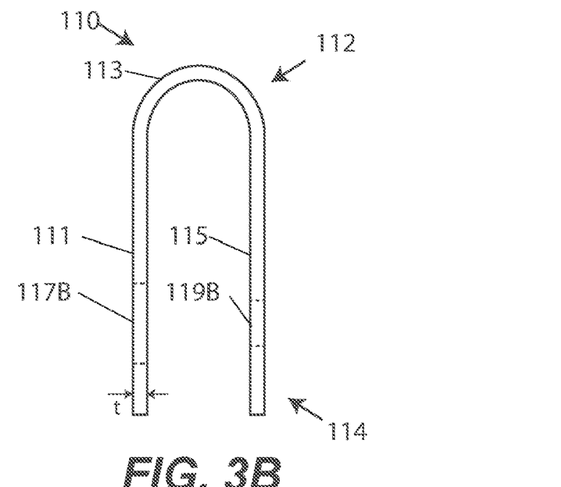
Figure 3C:
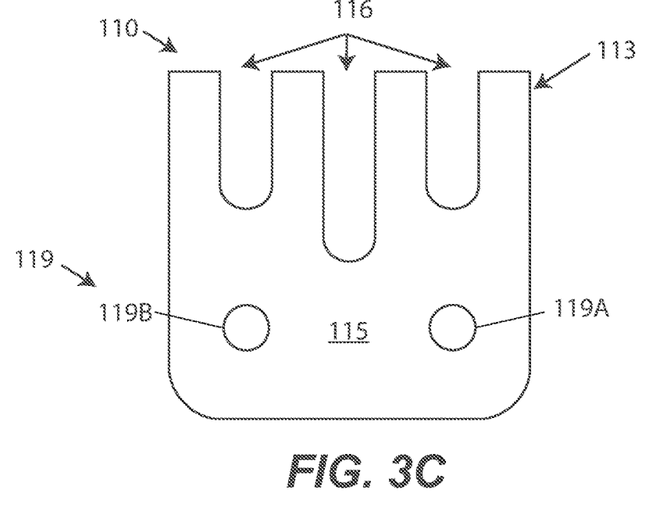

FIGS. 2A and 2B are a front side and end view, respectively, of one embodiment of a clamp 100, which includes a body 110 and fasteners 120. FIGS. 3A, 3B, and 3C are a front side view, an end view, and a rear side view, respectively, of body 110.

As shown in the end views of FIGS. 2B and 3B, body 110 has a generally U-shape along a length L, where the U-shape is defined by a front portion 111 and a rear portion 115, each having a height H and separated by a distance w, and a curved portion 113 at a proximal end 112 of the body that joins portions 111 and 115. Body 110 thus has a closed end at curved portion 113 and an opening formed by the free ends of portions 111 and 115. Body 110 also includes optional apertures 116, which may be provided to decrease the stiffness of the body or to remove material that is not essential for the strength of clamp 100. In certain embodiments, body 110 is formed from sheet metal.

At distal end 114 of body 110, front portion 111 and rear portion 115 have aperture for attaching one or more fasteners 120, shown as a first fastener 120A and a second fastener 120B. Thus, front portion 111 has apertures 117A and 117B and rear portion 115 has apertures 119A and 119B. The number of fasteners in clamp 100 may be one, two, or more fasteners, and is selected to provide sufficient force on the accepted rods, as described subsequently.

First fastener 120A and second fastener 120B are generally similar and include a bolt 121 and a nut 123. Apertures 117A and 119A are aligned to accept bolt 121 of first fastener 120A, and apertures 117B and 119B are aligned to accept bolt 121 of second fastener 120B, As illustrated in FIGS. 2A and 2B, each fastener 120A and 120B may thus pass through front portion 111 and rear portion 115 and may be tightened using the respective nut 123, thus reducing or eliminating the size of the opening at the free ends of portions 111 and 115.

As discussed subsequently, clamp 100 includes an enclosed space 118 having width w and a height A between curved portion 113 and fasteners 120.

Figure 4A:
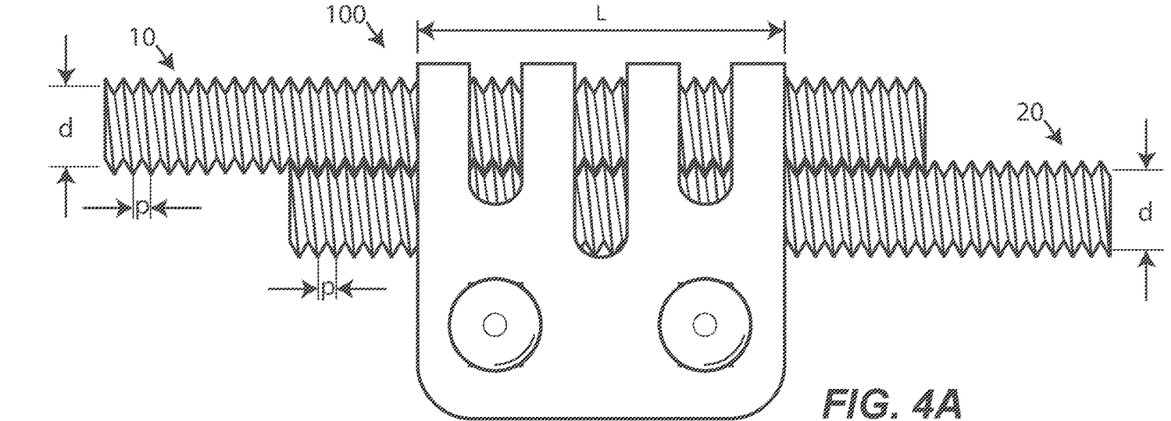
FIGS. 4A and 4B are a front side view and side view, respectively, illustrating the use of clamp of FIG. 2A as installed at the overlap of two rods.
Figure 4B:
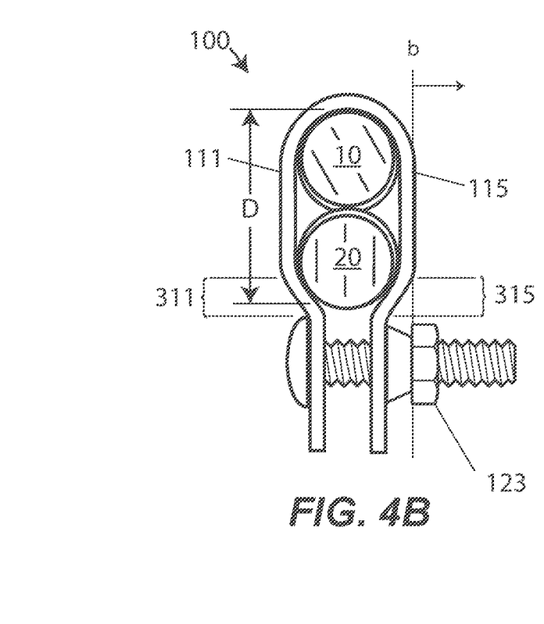

FIGS. 4A and 4B are a front side view and side view, respectively, illustrating the use of clamp 100 as installed at the overlap of the threaded portions of two rods within space 118, specifically the threads of a first rod 10 and a second rod 20. In various embodiments, rods 10 and 20 may have the same dimeter or be different diameters, may have the same thread pitch or different thread pitches, and/or the threads may overlap along the entire length L, or over a length that is less that the length L. In certain embodiments, rods 10 and 20 are threaded along their entire length. In other embodiments, one or more of rods 10 and 20 have threads along only a portion of their length, some of which is within body 110.

The inventive clamp operates by forcing the overlapping threads together within body 110. Thus, each rod being joined must have some threads adjacent to each other in body 110. The threaded portions of one or more joined rod may extend outside of the length L of body 110. Alternatively, one or more joined rods may have unthreaded portions within body 110. Importantly, at least a portion of the threads of the two or more joined rods are in contact within body 110.

While not necessarily limiting to the use of the clamp of the present invention, rods 10 and 20 are shown in FIGS. 4A and 4B as having the same diameter d the same thread pitch p and which overlap along the length L of clamp 100. As shown in FIGS. 4A and 4B, rods 10 and 20 are aligned to be parallel to one another within clamp 100. The Applicant has discovered that the inventive clamp restrains the relative longitudinal motion of the two rods more efficiently when the rods contact along their threaded portions, as opposed to clamping of unthreaded rods.

With threads of rods 10 and 20 placed within space 118, and one or more fasteners 120 are tightened to hold the rods within clamp 100. Specifically, in clamp 100, front portion 111 and rear portion 115 are deformable, and fasteners 120 are tightened to cause front portion 111 to deform at 311 and rear portion 115 to deform at 315, and thus compress rods 10 and 20 together within body 110. In one embodiment, the width w of body 110 is slightly greater than the diameter, d, of either one of rods 10 or 20, and the height A is larger than twice the diameter d. Preferably, when fasteners 120 are tightened, distal end 114 of body 110 deforms, as indicated near rod 20 in FIG. 3B, to hold rods 10 and 20 together with at least a portion of their threads overlapping in clamp 100.

With the rods thus clamped, the force on the overlapping threads will prevent, or at least inhibit, both the relative longitudinal motion of the rods, under compression or tension, and any bending motion transverse to the length of the two rods. That is, the clamped rods will approximately have the same structural use as a single rod.

In certain embodiments, it is desirable for nut 123 of each one of fasteners 120 to protrude away from body 110 to facilitate tightening fasteners 120. Thus, for example, FIG. 4B shows a line, b, which is an outer surface of rear portion 115, and an arrow facing away from body 110. Nut 123 has hex sides that extend beyond line b to allow a socket or wrench to fit about the hex nut without the socket or wrench being forced off the hex nut due to interference with the clamp body as the assembly is tightened. Specifically, a part of hex portion of nut 123 extends to away from line b, thus permitting a socket or wrench to fit about the hex nut without the socket or wrench being forced off the hex nut due to interference with body 110 as fastener 120 is tightened.

Figure 4C:
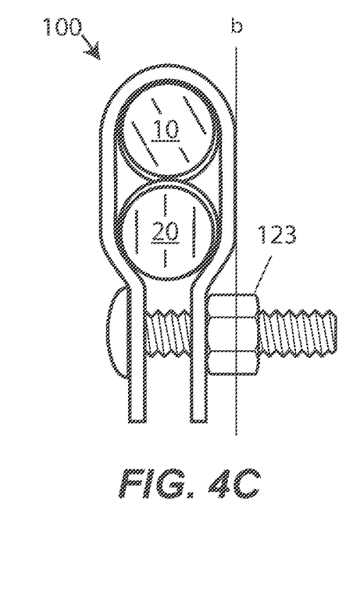
FIG. 4C is a side view, similar to that of FIG. 4B, using an alternative fastener embodiment.

FIG. 4C is a side view, similar to that of FIG. 4B, using an alternative fastener embodiment. In FIG. 4C, nut 123 is a long hex nut, with full length hex sides to allow a socket or wrench to fit about the hex nut without the socket or wrench being forced off the hex nut due to interference with the clamp body as the assembly is tightened.

Figure 4D:
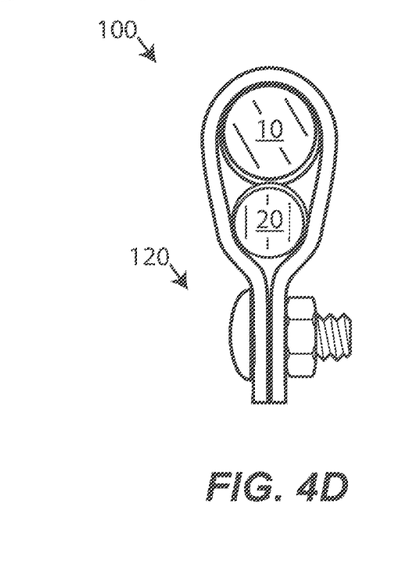
FIG. 4D is a side view, similar to that of FIG. 4B, illustrating the joining of rods with different diameters.

FIG. 4D is a side view, similar to that of FIG. 4B, illustrating the joining of rods 10 and 20 with different diameters. FIG. 4D illustrates that the smaller diameter rod 20 is adjacent to the fastener, though the invention is not necessarily limited to this configuration.

FIGS. 5A, 5B, 6A, and 6B are end views illustrative of several configurations for using clamps of FIG. 2A to provide lateral stability to a load. The figures illustrate the use of rods for securing loads which may be subject to seismic events as discussed, for example, in U.S. Pat. No. 9,777,870.

Figure 5A:
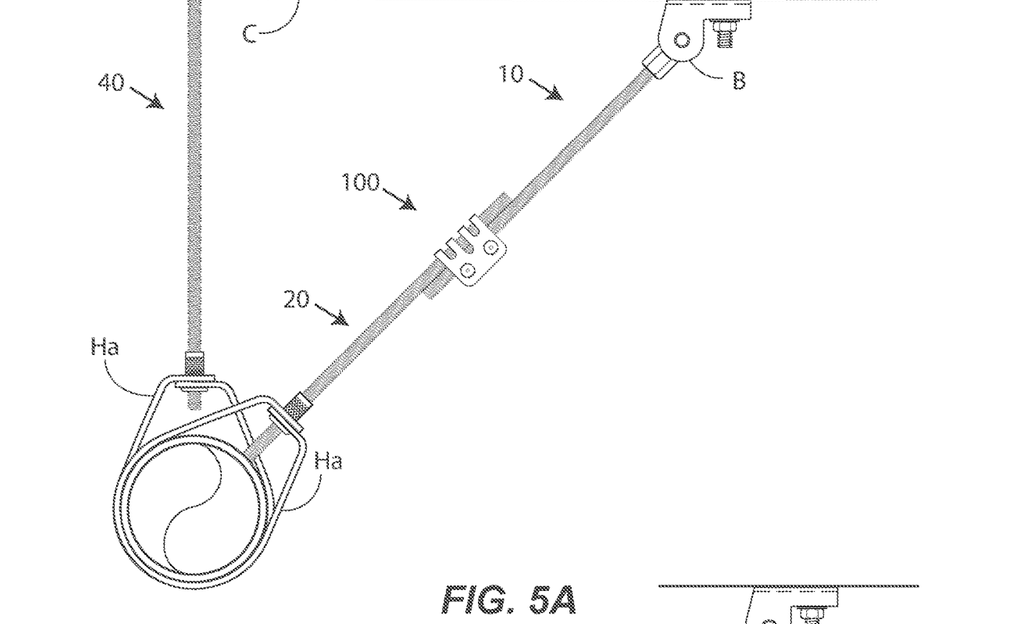
FIG. 5A is an end view illustrating two rods being constrained with one clamp of FIG. 2A.
Figure 5B:
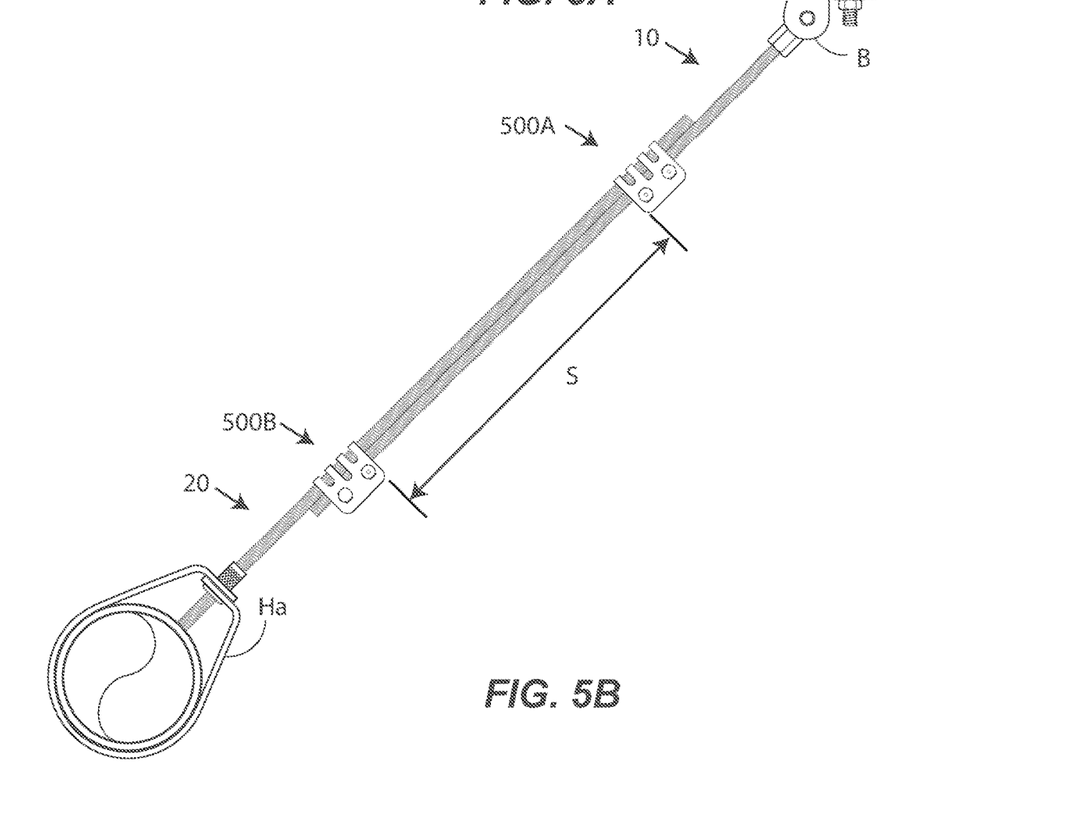
FIG. 5B is an end view illustrating two rods being constrained using two clamps of FIG. 2A.

FIGS. 5A and 5B illustrate the use of clamps to join rods 10 and 20. FIG. 5A illustrates a load, which is restrained in hanger Ha and which is supported from the ceiling C of an overhead structure with a rod 40, which is generally similar to rods 10 and 20. The figure also illustrates the use of rods 10 and 20 constrained with clamp 100, as described above.

FIG. 5B illustrates rods 10 and 20 constrained using two clamps, clamps 500A and 500B, which are each generally similar to clamp 100. Rod 40, as in FIG. 5A, is present but is not shown in FIG. 5B. The spacing of two clamps along the same two rods 10 and 20, separated by a distance S, in place of the single clamp of FIG. 5A, provides additional bending resistance to the rods. In addition, when rods 10 and 20 are under compression, the rods may have a tendency to rotate transversely relative to each other, causing the rods to move from their parallel configuration within the clamp. The spaced clamps help prevent rods 10 and 20 from moving from their parallel orientation and to remain firmly joined by the clamps.

In alternative embodiments, rods 40 and 10 are attached to different structures. Thus, rod 40 may be attached to the ceiling, and rod 10 is attached to a side wall or another rigid building structure element.

Figures 6A, 6B:
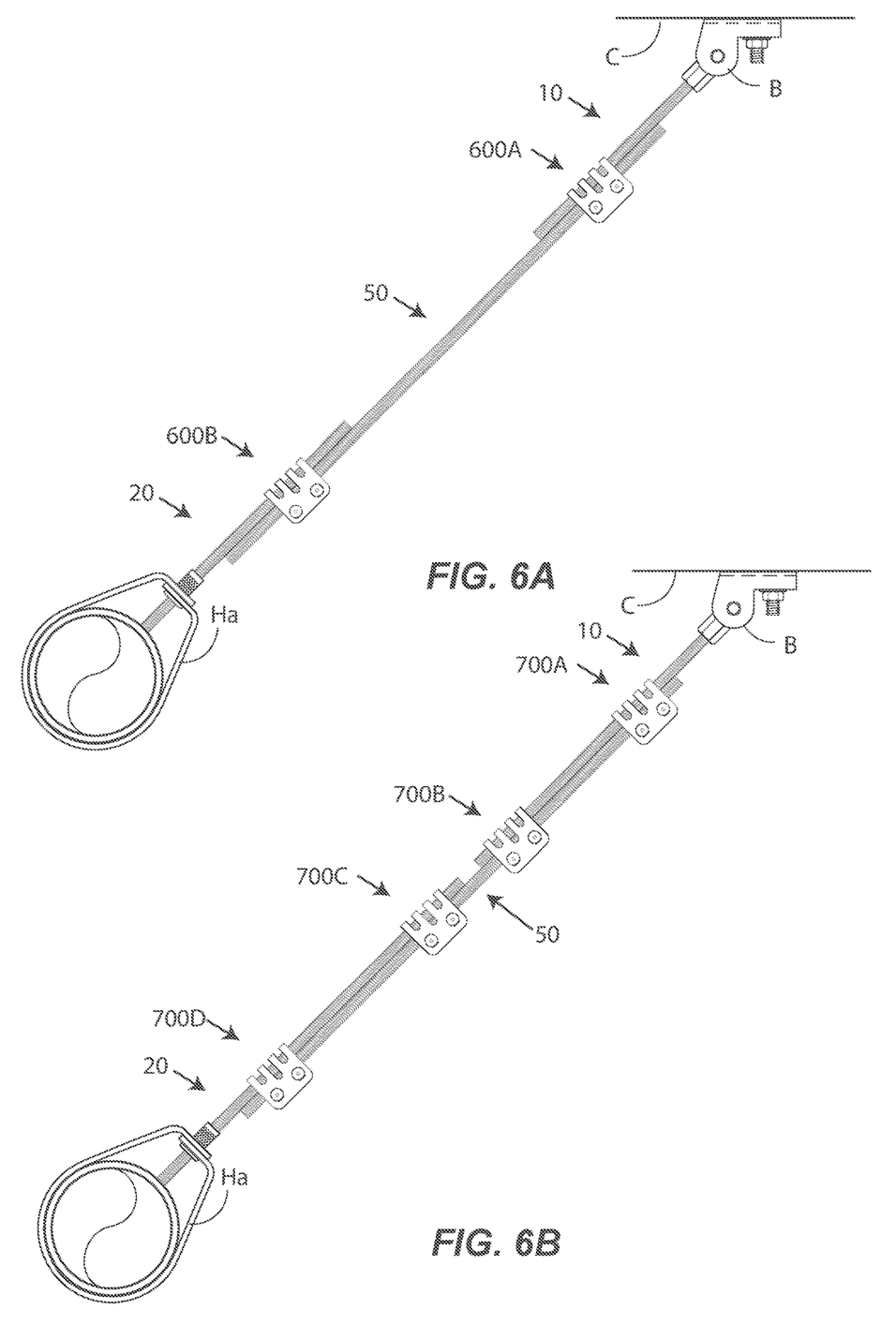
FIG. 6A is end view illustrating three rods being constrained using two clamps of FIG. 1A.
FIG. 6B is an end view illustrating three rods being constrained using four clamps of FIG. 1A.

FIGS. 6A and 6B both illustrate the use of clamps to join rods 10 and 20 using an intermediate rod 50, which generally has the same diameter and thread pitch of rods 10 and 20. Rod 40, as in FIG. 5A, is present but is not shown in FIGS. 6A and 6B.

FIG. 6A illustrates the use of a clamp 600A and a clamp 600B, which are both generally similar to clamp 100. The configuration of clamps in FIG. 6A is similar to that of FIG. 5A, where one clamp is used per pair of rods. Specifically, clamp 600A joins rods 10 and 50, and clamp 600B joins rods 50 and 20.

FIG. 6B illustrates the use of a clamp 700A, a clamp 700B, a clamp 700C, and a clamp 700D, which are each generally similar to clamp 100. The configuration of clamps in FIG. 6B is similar to that of FIG. 5B, where two clamps are used per pair of rods. Specifically, clamps 700A and 700B joins rods 10 and 50, and clamps 700C and 700D join rods 50 and 20.

Figures 7A, 7B:
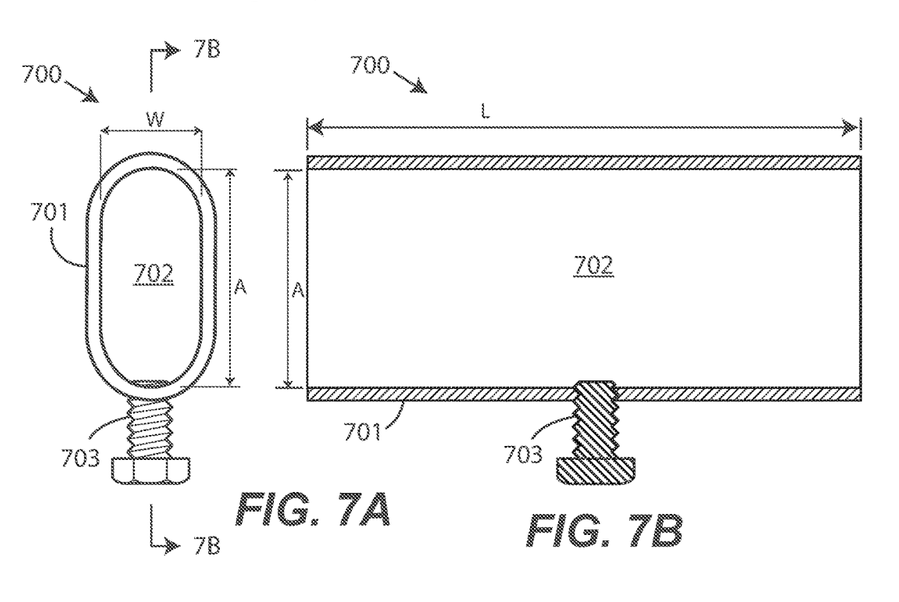
FIG. 7A is an end view of an alternative embodiment of a clamp.
FIG. 7B is sectional front view 7B-7B of FIG. 7A.

FIG. 7A is an end view of an alternative embodiment of a clamp, show as clamp 700, and FIG. 7B is sectional front view 7B-7B of FIG. 7A. Clamp 700 is generally the same, and is used in a manner generally the same, as clamp 100, except as explicitly noted.

Clamp 700 has a tubular body 701 that defines an opening 702, and has a fastener 703, that may be a bolt or screw. Tubular body may be formed from a metal. The end of fastener 703 extends through a threaded aperture in body 701 and into opening 702. Clamp 700 is used by placing threaded rod portions into the opening and tightening the fastener onto the rods in the opening.

Figures 8A, 8B:
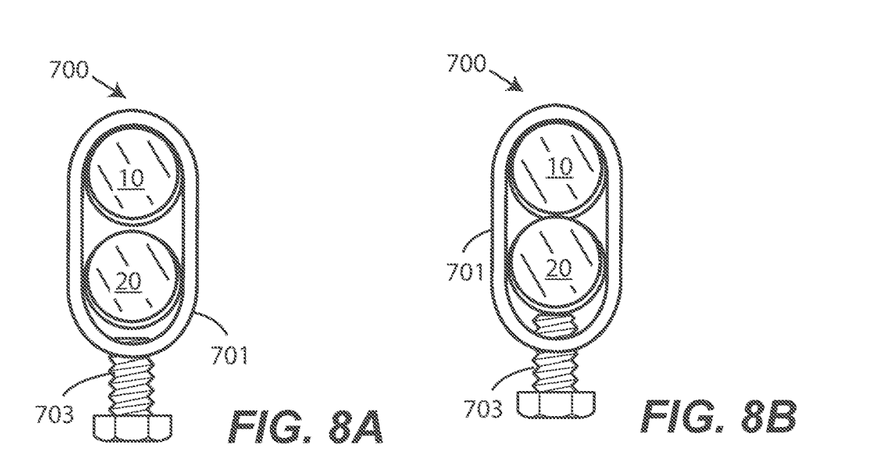
FIG. 8A is an end view of the clamp of FIG. 7A prior to joining two equal diameter rods.
FIG. 8B is an end view of the clamp of FIG. 8A where the two rods are joined.

Thus, for example, as illustrated in FIG. 8A, which is an end view of the clamp of FIG. 7A prior to joining two equal diameter rods 10 and 20, fastener 703 is retracted a sufficient distance to allow rods 10 and 20 through opening 702. As illustrated in FIG. 8B, which is an end view of the clamp of FIG. 8A, fastener 703 is advanced to contact a rod (rod 20), which contacts the other rod (rod 10), resulting in the joining of the rods.

Figure 9A:
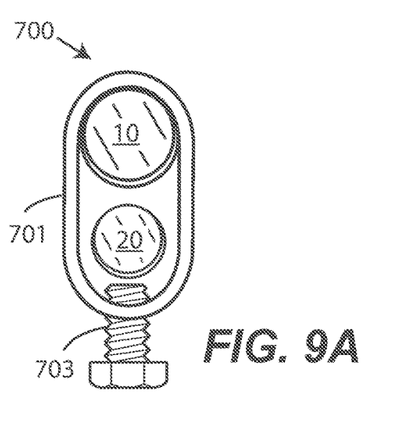
FIG. 9A is an end view of the clamp of FIG. 7A prior to joining two rods having different diameters.
Figure 9B:
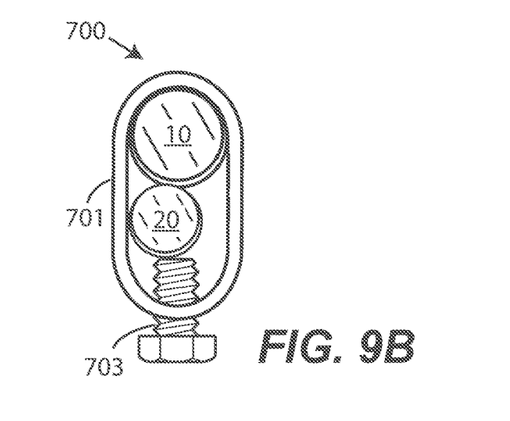
FIG. 9B is and end view of the clamp of FIG. 9A where the two rods are joined.

Clamp 700 may also be used to join rods of different diameters, as is illustrated in FIG. 9A as an end view of the clamp of FIG. 7A prior to joining two rods 10 and 20 having different diameters, and in FIG. 9B as an end view of the clamp of FIG. 9A where the two rods are joined.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

The invention claimed is:

1. A method of bracing a hanger supporting a load from a structure, the method comprising:
    attaching a first rod to the hanger;
    attaching a second rod to the structure; and
    joining a threaded portion of the first rod to a threaded portion of the second rod with an apparatus comprising a body having a length and an opening that extends along said length and a fastener in contact with the body,
    where said joining inhibits relative motion between the first rod and the second rod,
    where said joining includes contacting, within the body, the threaded portion of the first rod and the threaded portion of the second rod, and tightening the fastener against the first rod or the second rod.

2. The method of claim 1, where a diameter of the first rod and a diameter of the second rod are the same.

3. The method of claim 1, where a diameter of the first rod and a diameter of the second rod are different.

4. The method of claim 1, where a thread pitch of the first rod and a thread pitch of the second rod are the same.

5. The method of claim 1, where a thread pitch of the first rod and a thread pitch of the second rod are the different.

6. The method of claim 1,
where said body has a U-shape and has a proximal end and a distal end, where said body includes a curved portion at the distal end, and a front portion and a rear portion which are spaced apart from each other and which extend from the curved portion to the proximal end, and where said fastener is near the proximal ends of said front portion and said rear portion, or
where said body is a tube that is hollow along the length of the body and includes a threaded aperture through the tube, and where said fastener is a bolt that is threaded through the threaded aperture and has a distal end in the interior of the body.

7. The method of claim 1,
where said joining includes a first joining and a second joining,
where the apparatus is a first apparatus,
where the first joining joins a first threaded portion of the first rod to a first threaded portion of the second rod with said first apparatus, and
where the second joining joins a second threaded portion of the first rod to a second threaded portion of the second rod with a second apparatus comprising a body having a length and an opening that extends along said length and a fastener in contact with the body.

8. The method of claim 7, wherein, for said first apparatus or said second apparatus,
where said body has a U-shape and has a proximal end and a distal end, where said body includes a curved portion at the distal end, and a front portion and a rear portion which are spaced apart from each other and which extend from the curved portion to the proximal end, and where said fastener is near the proximal ends of said front portion and said rear portion, or
said body is a tube that is hollow along the length of the body and includes a threaded aperture through the tube, and where said fastener is a bolt that is threaded through the threaded aperture and has a distal end in the interior of the body.

9. The method of claim 7,
where said first joining includes contacting, within the body of said first apparatus, the first threaded portion of the first rod and the first threaded portion of the second rod, and tightening the fastener of said first apparatus, and
where said second joining includes contacting, within the body of said second apparatus, the second threaded portion of the first rod and the second threaded portion of the second rod, and tightening the fastener of said second apparatus against the first rod or the second rod.

10. The method of claim 1,
where said joining includes a first joining and a second joining,
where the apparatus includes a first apparatus and a second apparatus,
where said first joining joins a first threaded portion of the first rod to a first threaded portion of a third rod with the first apparatus, and
where said second joining joins a second threaded portion of the second rod to a second threaded portion of the third rod with the second apparatus comprising a body having a length and an opening that extends along said length and a fastener in contact with the body.

11. The method of claim 10, where a diameter of the third rod is the same as the diameter of either the first rod or the second rod.

12. The method of claim 10, where a diameter of the third rod is different than the diameter of either the first rod or the second rod.

13. The method of claim 10, where a thread pitch of the third rod is the same as the thread pitch of either the first rod or the second rod.

14. The method of claim 10, where a thread pitch of the third rod is different than the thread pitch of either the first rod or the second rod.

15. The method of claim 10, wherein, for said first apparatus or said second apparatus,
where said body has a U-shape and has a proximal end and a distal end, where said body includes a curved portion at the distal end, and a front portion and a rear portion which are spaced apart from each other and which extend from the curved portion to the proximal end, and where said fastener is near the proximal ends of said front portion and said rear portion, or
said body is a tube that is hollow along the length of the body and includes a threaded aperture through the tube, and where said fastener is a bolt that is threaded through the threaded aperture and has a distal end in the interior of the body.

16. The method of claim 10,
where said first joining includes contacting, within the body of said first apparatus, the first threaded portion of the first rod and the first threaded portion of the third rod, and tightening the fastener of said first apparatus against the first rod or the third rod, and
where said second joining includes contacting, within the body of said second apparatus, the second threaded portion of the second rod and the second threaded portion of the third rod, and tightening the fastener of said second apparatus against the second rod or the third rod.

17. The method of claim 10,
where said joining further includes a third joining and a fourth joining,
where the apparatus further includes a third apparatus and a fourth apparatus,
where said third joining joins a third threaded portion of the first rod to a third threaded portion of the third rod with the third apparatus comprising a body having a length and an opening that extends along said length and a fastener in contact with the body, and
where said fourth joining joins a fourth threaded portion of the second rod to a fourth threaded portion of the third rod with the fourth apparatus comprising a body having a length and an opening that extends along said length and a fastener in contact with the body.

18. The method of claim 17, wherein, for said first apparatus, said second apparatus, said third apparatus or said fourth apparatus,
where said body has a U-shape and has a proximal end and a distal end, where said body includes a curved portion at the distal end, and a front portion and a rear portion which are spaced apart from each other and which extend from the curved portion to the proximal end, and where said fastener is near the proximal ends of said front portion and said rear portion, or
said body is a tube that is hollow along the length of the body and includes a threaded aperture through the tube, and where said fastener is a bolt that is threaded through the threaded aperture and has a distal end in the interior of the body.

19. The method of claim 17,
- where said first joining includes contacting, within the body of said first apparatus, the first threaded portion of the first rod and the first threaded portion of the third rod, and tightening the fastener of said first apparatus against the first rod or the third rod,
- where said second joining includes contacting, within the body of said second apparatus, the second threaded portion of the first rod and the second threaded portion of the third rod, and tightening the fastener of said second apparatus against the first rod or the third rod,
- where said third joining includes contacting, within the body of said third apparatus, the third threaded portion of the second rod and the third threaded portion of the third rod, and tightening the fastener of said third apparatus against the second rod or the third rod, and
- where said fourth joining includes contacting, within the body of said fourth apparatus, the fourth threaded portion of the second rod and the fourth threaded portion of the third rod, and tightening the fastener of said fourth apparatus against the second rod or the third rod.

* * * * *